Jan. 29, 1963  T. R. SPALDING  3,076,089
APPARATUS FOR DETECTING HOT JOURNAL BOXES
Filed Aug. 6, 1954

INVENTOR.
THOMAS R. SPALDING
BY George R. Gust
ATTORNEY 3,076,089
APPARATUS FOR DETECTING HOT JOURNAL BOXES
Thomas R. Spalding, Riverbend, Ind., assignor to International Telephone and Telegraph Corporation
Filed Aug. 6, 1954, Ser. No. 448,264
4 Claims. (Cl. 246—169)

The present invention relates to an apparatus and method for detecting hot journal boxes on railway cars by the use of radioactive material or radiation source.

A major problem confronting railroads is the fact that the journal bearings of the rolling gear become defective and as a result overheat during operation with consequent complete damage and wreckage of an entire train of cars often following. One method of determining whether or not a journal bearing is defective is to check the temperature of the bearing enclosures, commonly characterized as journal boxes. A box found to be hot has always been taken as an indication of impending trouble and ordinarilly, as a preventive measure, the particular car concerned is withdrawn from the train until the defective condition is corrected.

One of the usual methods of determining whether or not a box is overheated is by sense of touch, the worker laying his hand on the box immediately following a normal train run. If the box is hot to the touch, such has been taken as an indication of trouble. This method of checking is obviously time-consuming and unreliable in that the sense of touch is not accurate and the workers are subject to human error and carelessness. With the advent of ever-increasing train speeds, the seriousness of over-heated journal boxes has greatly multiplied and many wrecks presumably could have been prevented had some positive method of detecting the journal box temperature been available shortly prior to the wreck. It is a principal object of this invention to provide a method and apparatus for detecting overheated journal boxes during normal operation of a train.

It is a further object of this invention to provide a method and apparatus for detecting overheated journal boxes by the use of radioactive material or source in conjunction with attenuation means whereby radiation will be increased only when a journal box is heated to a predetermined temperature.

In accomplishing this invention, a radioactive source is encased in a shield made of lead or other high density, low-melting point material which will sharply attenuate radiation from the source. The shielding enclosure or capsule containing the source is attached in some suitable manner to the bearing journal or placed in the journal box of a railway car, and will melt at the temperatures encountered in an overheated journal. After the shield melts, radiation at maximum intensity issues into space for detection by a suitable instrument. A signal produced by the instrument can be utilized in any suitable manner for warning the railway operators of the existence of the overheated box.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
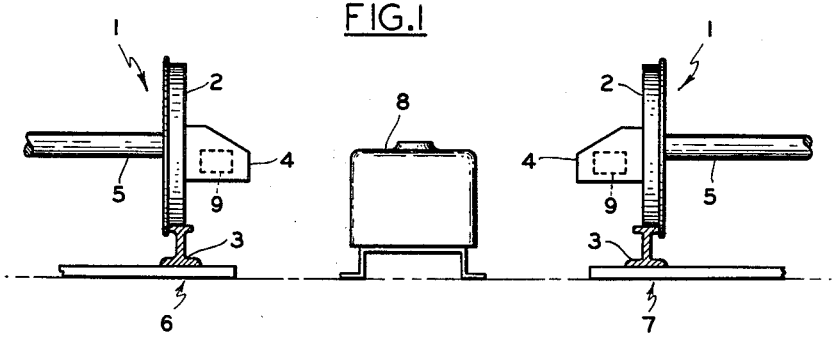
FIG. 1 is an allustration of one embodiment of this invention.

With reference to the drawings, the usual railway vehicles are transported by the illustrated wheels and axles indicated generally by the reference numeral 1. The wheel 2 rolls on the usual rail 3, and the journal box 4 serves as an enclosure for the journal bearing of the axle 5. This construction is entirely conventional. In FIG. 1, two trackways, indicated generally by the reference numerals 6 and 7, respectively, extend parallel and have positioned therebetween a radiation-detecting device, generally indicated by the reference numeral 8. While two trackways have been shown, it will be obvious from the following that the present invention may be used with only a single trackway.

Figure 2:
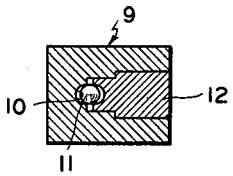
FIG. 2 is a sectional illustration of a capsule containing the radioactive material.

A radioactive source material is carried by a housing or capsule, indicated by the dashed line blocks 9 in FIG. 1 and illustrated in detail in FIG. 2. This capsule is of sufficiently small dimension and physical configuration as to be capable of insertion into a bore in the end of the axle 1 to be secured to the journal box directly by some suitable means or to be placed loosely in the journal box. As seen in FIG. 2, the capsule 9 is cup-shaped to provide a stepped recess 10 for holding the radioactive material 11. A stepped plug 12 made of the same material as the cup-shaped member serves as a shielding closure, such that the radioactive material 11 will be completely surrounded by the capsule material. This capsule is preferably made of a low-melting lead alloy or other high density material having a low melting point, and is sufficiently thick to attenuate the radiation from the source to a predetermined low level.

The melting point of this shielding material is so selected that the capsule will melt away when the journal box 4 becomes overheated. The radiation from the source 11 thus is no longer attenuated by the shield and may be detected by a suitable device positioned a short distance away.

It will now appear that it is necessary to position the capsule 9 in such a location in the journal box 4 that when the journal bearing becomes overheated the capsule 9 will melt.

A suitable radiation detector 8 is positioned sufficiently close to the trackway to be energized by the radiation from the material 11. Suitable detectors are well-known to the art, and may consist of the susal Geiger Counter or ion chamber which produces a signal upon being energized by the source radiation.

In operation, while the journal boxes 4 are running at normal temperatures, low level radiation will emanate from the capsule 9, such that the detector 8 will not be energized. However, when a journal box 4 becomes overheated, the capsule 9 will melt, increasing the radiation. As the particular overheated journal box passes the location of the detector 8, the latter will be energized by the radiation and will produce a corresponding signal. This signal is observed by an operator, who may take the necessary steps for correcting the situation.

Preferably, the material 11 is of such character as to produce gamma radiation which when properly shielded is of such low level as not to be dangerous. However, the radiation level when the shield is removed must be sufficiently intense to energize the detector 8 through the walls of the journal box.

The cup-shaped portion of the capsule 9 may be composed of suitable high-melting point lead alloy, or other high density high melting point metal, while the plug 12 is made of low-melting high density alloy. In this case, only the plug 12 will melt when the journal box becomes overheated, whereupon the radiation from the material 11 will escape only from the capsule recess. By this means, the radiation may be directed by the walls of the recess in an axial direction with respect to the axle 5 of FIG. 1 for interception by the detector 8.

What is claimed is:

1. A hot journal box detecting apparatus for use on railroads comprising a railroad journal box, a housing made of material which will melt when said journal box becomes overheated and having a cavity formed therein radioactive material contained in said housing cavity, said housing attenuating the radiation except when the housing is melted, said housing being disposed in said journal box so that overheating of said journal box melts said housing thereby exposing said radioactive material; and a radiation detector adapted to be positioned at a point next to railroad tracks on which said journal box is transported, said detector being sensitive to said radiation to produce a warning signal when said housing has been melted by the overheated journal box.

2. A hot journal box detecting apparatus comprising a railroad vehicle journal box, a cup-shaped housing made of high-melting point material, radioactive material disposed in said cup-shaped housing, said housing being made of material which attenuates radiation emanating from said radioactive material, a closure for said housing, said closure being made of low-melting point material which attenuates said radiation; and a radiation detector adapted to be positioned adjacent to railroad tracks on which said journal box is transported, said detector being sensitive to said radiation to produce a warning signal, said housing being positioned in said journal box so that said closure is juxtaposed relative to said detector whereby an overheated journal box causes said closure to melt and to thereby expose said detector to the radiation of said radioactive material.

3. In a railroad car, a journal box, a body of radioactive material secured to a portion of the journal box, shield means for absorbing emanations from the radioactive material, means for securing the shield means superimposed over the body of radioactive material and secured to said journal box under normal temperature, said securing means including temperature-responsive means to release the shield upon reaching of a predetermined temperature by the journal box; whereby abnormal heating of the journal box may be detected by a radioactivity detector adjacent its path.

4. In a railroad car, a journal box, a body of radioactive material positioned on said journal box, shield means for absorbing emanations from the radioactive material, and means for securing said shield means over said radioactive material in heat transfer relation to said journal box under normal temperature conditions, said securing means including temperature-responsive means to release the shield upon said journal box reaching a predetermined temperature to expose said radioactive material; whereby abnormal heating of said journal box may be detected by a radioactivity detector adjacent its path.

References Cited in the file of this patent

UNITED STATES PATENTS

| | | |
|---|---|---|
| 1,496,194 | Ziegler | June 3, 1924 |
| 1,512,456 | Carman | Oct. 21, 1924 |
| 2,620,435 | Vogt et al. | Dec. 2, 1952 |